United States Patent
Kim et al.

(10) Patent No.: US 12,191,096 B2
(45) Date of Patent: *Jan. 7, 2025

(54) POWER DEVICE MONITORING SYSTEM

(71) Applicant: LS ELECTRIC CO., LTD., Anyang-si (KR)

(72) Inventors: Young Kim, Anyang-si (KR); Min-Kyu Seo, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 241 days.

This patent is subject to a terminal disclaimer.

(21) Appl. No.: 17/916,747

(22) PCT Filed: Mar. 29, 2021

(86) PCT No.: PCT/KR2021/003875
§ 371 (c)(1),
(2) Date: Oct. 3, 2022

(87) PCT Pub. No.: WO2021/201539
PCT Pub. Date: Oct. 7, 2021

(65) Prior Publication Data
US 2023/0154712 A1 May 18, 2023

(30) Foreign Application Priority Data
Apr. 3, 2020 (KR) .................. 10-2020-0041148

(51) Int. Cl.
*H01H 47/00* (2006.01)
*H01H 71/04* (2006.01)
*H01H 71/52* (2006.01)

(52) U.S. Cl.
CPC .......... *H01H 71/04* (2013.01); *H01H 71/522* (2013.01); *H01H 2071/046* (2013.01)

(58) Field of Classification Search
None
See application file for complete search history.

(56) References Cited

U.S. PATENT DOCUMENTS 6,169,653 B1 * 1/2001 Engel ................ H02B 1/21
361/600
12,009,642 B2 * 6/2024 Kim .................. H02B 11/133
(Continued)

FOREIGN PATENT DOCUMENTS

| CN | 104112997 A | 10/2014 |
| CN | 104165592 A | 11/2014 |

(Continued)

OTHER PUBLICATIONS

International Search Report for related International Application No. PCT/KR2021/003875; action dated Jul. 19, 2021.
(Continued)

*Primary Examiner* — Stephen W Jackson
(74) *Attorney, Agent, or Firm* — K&L Gates LLP (57) ABSTRACT

The present disclosure relates to a power device monitoring system comprising: a cradle having a cradle terminal formed on the rear side thereof; a circuit breaker mechanically or electrically connected to or separated from the cradle terminal; at least one position detection means mounted inside the circuit breaker so as to detect the position of a circuit breaker body in real time; and a display unit for outputting the mobile characteristic of the circuit breaker body detected by the position detection means.

11 Claims, 11 Drawing Sheets

(56) References Cited

U.S. PATENT DOCUMENTS

| | | | |
|---|---|---|---|
| 2008/0088396 A1* | 4/2008 | Ahn | ......................... H01H 3/30 335/165 |
| 2015/0114807 A1 | 4/2015 | Benke et al. | |
| 2017/0237241 A1 | 8/2017 | Benke et al. | |

FOREIGN PATENT DOCUMENTS

| | | |
|---|---|---|
| CN | 107275970 A | 10/2017 |
| DE | 4131819 A1 | 3/1993 |
| JP | 58195932 U | 12/1983 |
| JP | 2007149369 A | 6/2007 |
| JP | 2014033590 A | 2/2014 |
| JP | 2014143867 A | 8/2014 |
| KR | 200340100 Y1 | 1/2004 |
| KR | 200462421 Y1 | 9/2012 |
| KR | 20130000281 A | 1/2013 |

OTHER PUBLICATIONS

Written Opinion for related International Application No. PCT/KR2021/003875; action dated Jul. 19, 2021.
Extended European Search Report for related European Application No. 21781427.6; action dated Aug. 11, 2023; (10 pages).
Office Action for related Japanese Application No. 2022-558206; action dated Nov. 22, 2023; (9 pages).

* cited by examiner

POWER DEVICE MONITORING SYSTEM

CROSS-REFERENCE TO RELATED APPLICATION

The present application is a National Stage of International Application No. PCT/KR2021/003875 filed on Mar. 29, 2021, which claims priority to and the benefit of Korean Utility Model Application No. 10-2020-0041148, filed on Apr. 3, 2020, the disclosure of which is incorporated herein by reference in its entirety.

FIELD

The present disclosure relates to a monitoring system of a power device, and more particularly, to a monitoring system of a power device capable of continuously detecting an exact position of a circuit breaker body moving in a cradle.

BACKGROUND

In general, a power device refers to any device that may receive and transmit power and convert the power.

Figure 1:
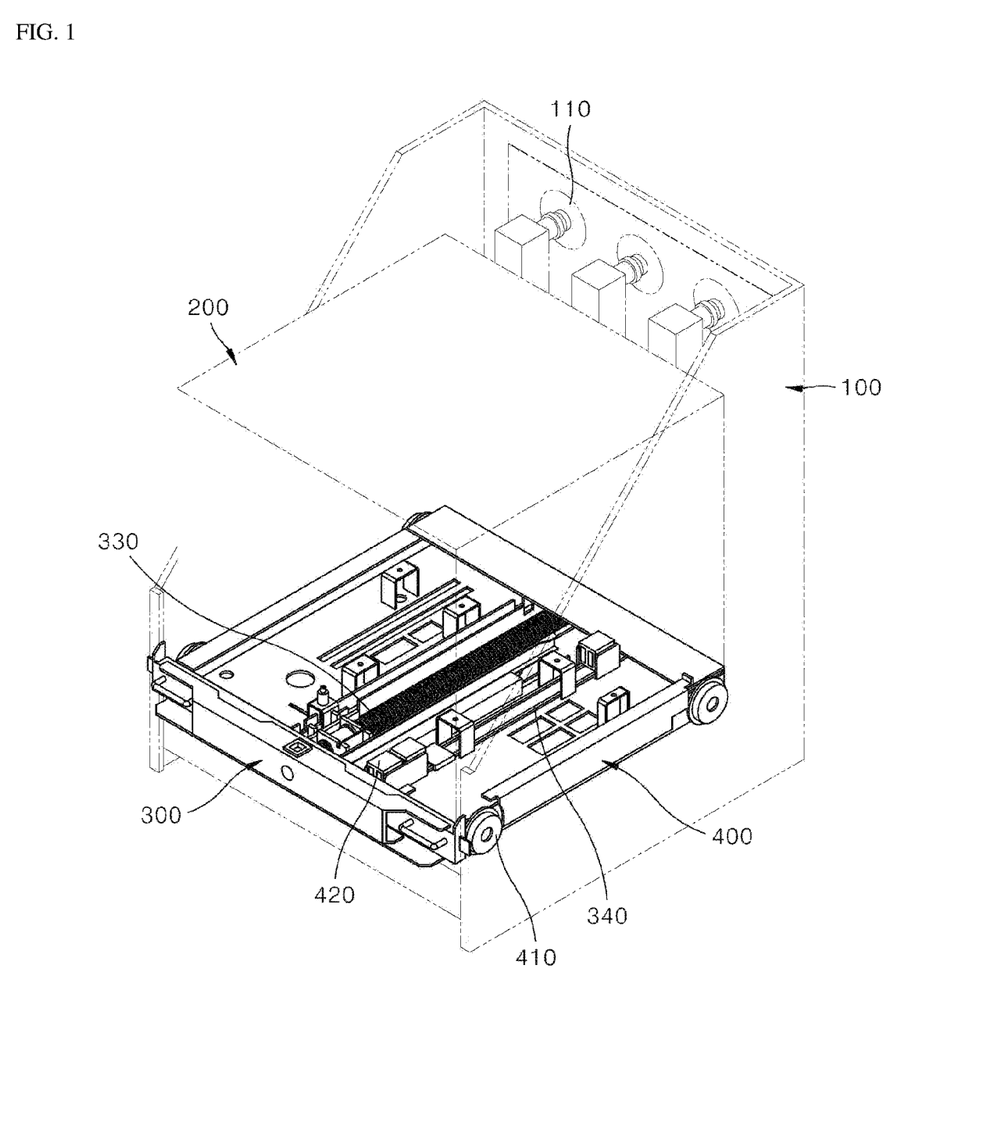
FIG. 1 is a perspective view showing a conventional power device.

FIG. 1 is a perspective view showing a conventional power device.

Referring to FIG. 1, the conventional power device includes a cradle terminal 110 connected to a power line connected to an external power source or a load. Further, the power device includes a cradle 100 fixed to a switchboard, a circuit breaker body 200 mechanically and electrically connected to or disconnected from the terminal 110 of the cradle 100, and a girder 300 and a truck 400 to bring the circuit breaker body 200 to a contact or disconnection position in which the body is mechanically and electrically connected to or disconnected from the terminal 110 of the cradle 100.

In this regard, the contact position means a position in which the circuit breaker body 200 approaches the cradle terminal 110 at the maximum level and electrically contacts the terminal 110.

Further, the disconnection position means a position in which the circuit breaker body 200 is spaced from the cradle terminal 110 by the maximum spacing and thus is electrically disconnected from the cradle terminal 110.

Further, a test position means a position corresponding to a process in which the body is being displaced from the contact position to the disconnection position or from the disconnection position to the contact position.

Figure 2:
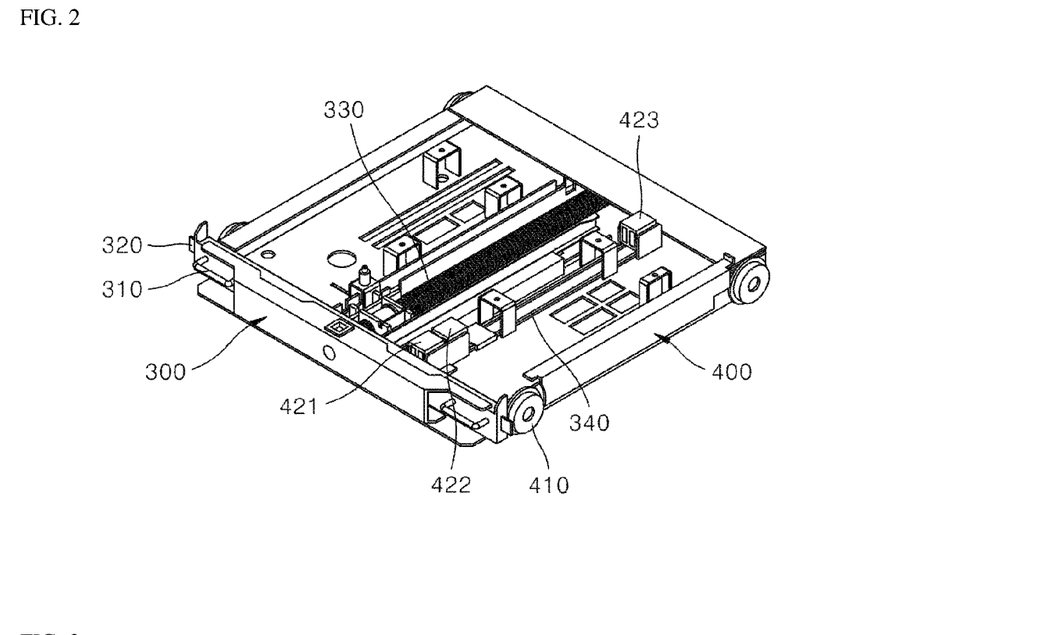
FIG. 2 is a perspective view showing a girder and a truck according to a disconnection position in the conventional power device.
Figure 3:
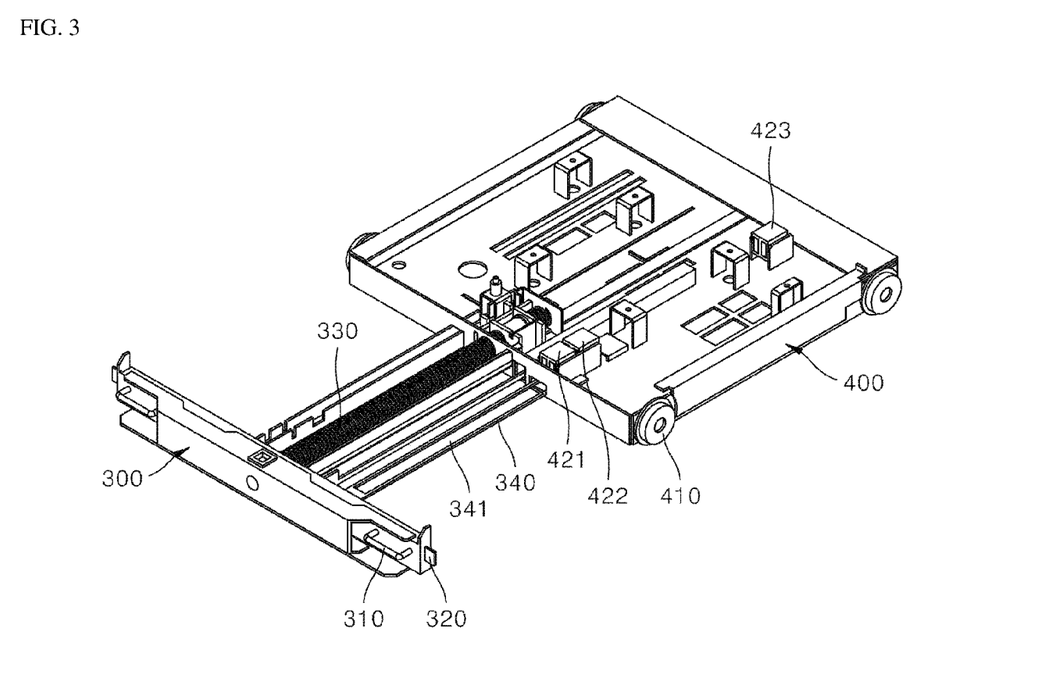
FIG. 3 is a perspective view showing the girder and the truck according to a contact position in the conventional power device.

Further, FIG. 2 and FIG. 3 are perspective views showing the girder 300 and the truck 400 according to the disconnection position and the contact position in FIG. 1, respectively.

Figure 4:
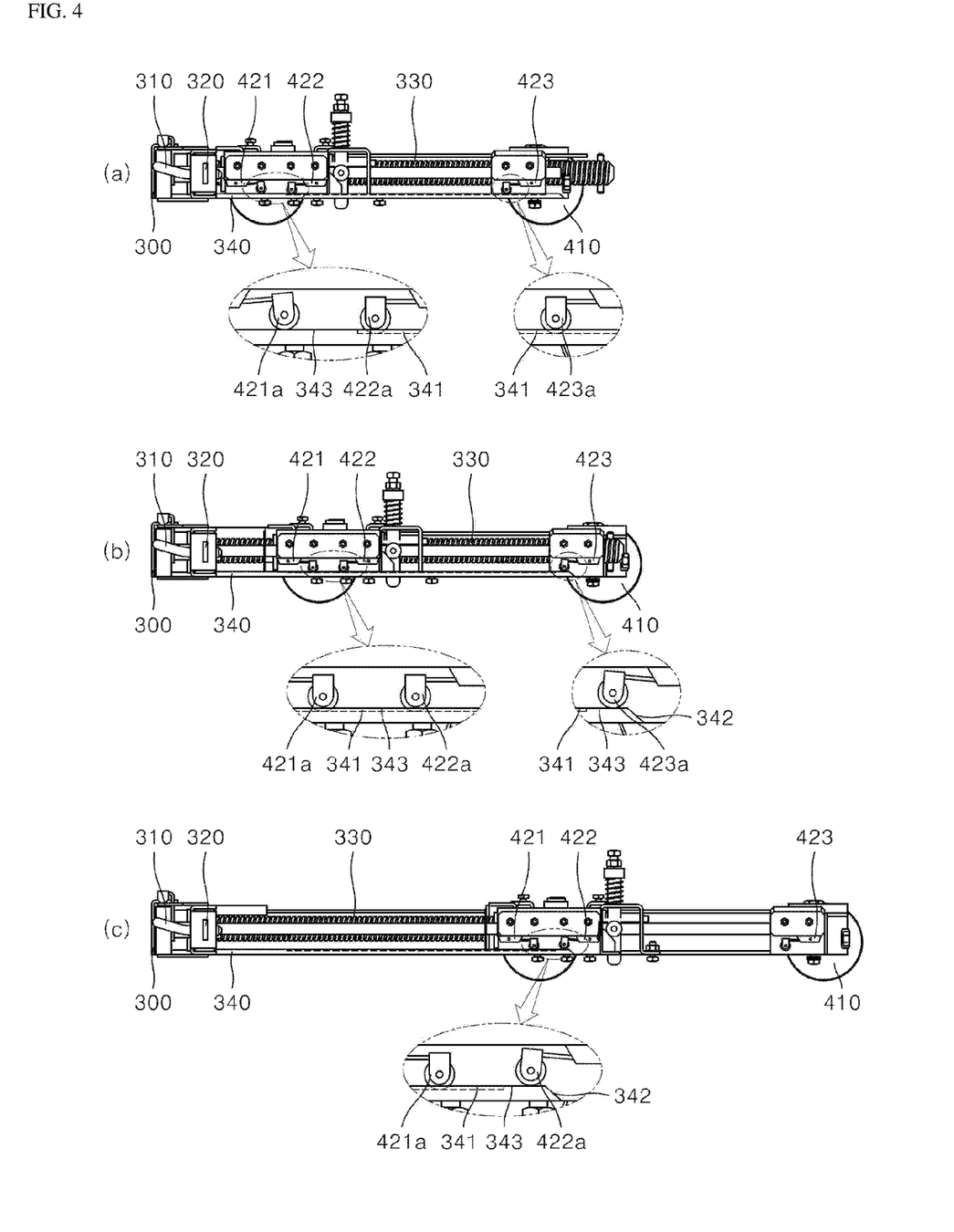
FIG. 4 is a cross-sectional view showing the girder and the truck according to each of the disconnection, test, and contact positions in the conventional power device.

Further, FIG. 4 shows cross-sectional views of the girder 300 and the truck 400 according to disconnection, test, and contact positions in the conventional power device, respectively.

Referring to FIGS. 2 to 4, in the conventional power device, the girder 300 includes a pair of handle bars 310 formed on a front face thereof, support ribs 320 respectively formed at both opposing sides thereof, and a spindle 330 having one end rotatably coupled to a center of the front face thereof, and a switch actuation bar 340 formed on one side of the spindle 330.

Further, the truck 400 includes a plurality of wheels 410 formed at each of both opposing sides thereof and a plurality of micro switches 420 actuated by the switch actuation bar 340. As the spindle 330 rotates, a spacing between the truck 400 and the girder 300 is adjusted as shown in FIGS. 2 and 3.

That is, as the spindle 330 rotates clockwise or counter-clockwise, the spacing between the truck 400 and the cradle terminal 110 is adjusted.

Further, the switch actuation bar 340 includes an elongate groove 341 formed to correspond to a movement range of the truck 400, a rear end inclined portion 342 formed at one end of the groove 341, and a top planar portion 343 constituting a top face except for the groove 341 and the rear end inclined portion 342.

Further, the micro switch 420 includes first to third micro switches 421, 422, and 423.

In more detail, the first micro switch 421 includes a first contact lever 421a formed on a bottom thereof so as to contact the switch actuation bar 340, and is closest to the girder 300.

Further, the second micro switch 422 includes a second contact lever 422a formed on a bottom thereof so as to contact the switch actuation bar 340, and is adjacent to a rear end of the first micro switch 421.

Further, the third micro switch 423 includes a third contact lever 423a formed on a bottom thereof so as to contact the switch actuation bar 340, and is adjacent to a rear end of the truck 400.

A method for detecting a relative position between the terminal 110 of the cradle 100 and the circuit breaker body 200 using the truck 300 in this conventional power device is as follows.

Referring to (a) of FIG. 4, the spacing between the truck 400 and the girder 300 becomes minimum at the disconnection position of the conventional power device.

Accordingly, the distance between the circuit breaker body 200 and the cradle terminal 110 becomes maximum.

Further, the first contact lever 421a is in contact with the top planar portion 343, while each of the second contact lever 422a and the third contact lever 423a is in contact with the groove 341.

Further, referring to (b) of FIG. 4, at the test position of the conventional power device, as the spacing between the girder 300 and the truck 400 increases, each of the first contact lever 421a and the second contact lever 422a comes into contact with the groove 341.

Further, the third contact lever 423a passes by the rear end inclined portion 342 and then comes into contact with the top planar portion 343.

Further, referring to (c) of FIG. 4, at the contact position of the conventional power device, the spacing between the truck 400 and the girder 300 becomes maximum.

Accordingly, the circuit breaker body 200 is in contact with and thus electrically connected to the cradle terminal 110.

At this time, the first contact lever 421a comes into contact with the groove 341, and the second contact lever 422a passes by the rear end inclined portion 342 and comes into contact with the top planar portion 343.

As described above, in the prior art, the spacing the truck 400 and the girder 300 is adjusted in a state in which the switch actuation bar 340 is coupled to the girder 300. Thus, the position of the circuit breaker body 200 is detected based on whether the plurality of micro switches 420 fixedly installed on the truck 400 are in contact with the switch actuation bar 340.

Accordingly, in the prior art, the position of the circuit breaker body 200 may be detected at each of the disconnection, test, and contact positions of the power device.

However, a varying distance between the circuit breaker body 200 and the cradle terminal 110 cannot be detected.

SUMMARY

A purpose of the present disclosure is to provide a monitoring system of a power device which is capable of linearly detecting a position of a circuit breaker body over an entirety of a movement range using a relatively simple structure.

Purposes according to the present disclosure are not limited to the above-mentioned purpose. Other purposes and advantages according to the present disclosure that are not mentioned may be understood based on following descriptions, and may be more clearly understood based on embodiments according to the present disclosure.

Further, it will be easily understood that the purposes and advantages according to the present disclosure may be realized using means shown in the claims and combinations thereof.

In order to achieve the purpose, the present disclosure, the present disclosure provides a monitoring system of a power device comprising: a cradle having a cradle terminal disposed on a rear side thereof; a circuit breaker configured to mechanically and electrically contact or be disconnected from the cradle terminal; at least one position detecting means mounted inside the circuit breaker so as to detect a position of a circuit breaker body in real time; and a display for outputting movement characteristics of the circuit breaker body detected by the position detecting means.

More specifically, the movement characteristics of the circuit breaker body output from the display may include at least one of a movement distance of the circuit breaker body, a remaining distance thereof to a contact or disconnection position, a movement speed thereof, change in the movement speed thereof, a contact amount between the circuit breaker body and the cradle terminal, or an expected time duration for which the circuit breaker body has been inserted.

Further, the position detecting means may include: a position bar including at least one position detected area portion extending in a corresponding manner to a movement range of the circuit breaker body, wherein one end of the position bar is coupled to a girder fixedly installed on a front face of the cradle, and the other end of the position bar acts as a free end facing the rear side of the cradle; a sensor module installed inside a truck, wherein the circuit breaker body is loaded on the truck, and the position bar is inserted into the truck, wherein the truck is configured to reciprocate from the girder to the cradle terminal and inside the cradle, wherein the sensor module includes at least one sensor facing the position detected area portion; and a controller configured to receive movement characteristics of the position detected area portion detected by the sensor module, and to detect the movement characteristics of the circuit breaker body based on the received movement characteristics of the position detected area portion.

Alternatively, the position detecting means may include: a position detected area portion formed on at least one of both opposing side faces of the circuit breaker body; a sensor module including at least one sensor facing the position detected area portion so as to detect a displaced position of the position detected area portion and thus detect a position of the circuit breaker body, based on the detect displaced position, wherein the sensor module is fixed to at least one of both opposing inner faces of the cradle; and a controller configured to receive movement characteristics of the position detected area portion detected by the sensor module, and to detect the movement characteristics of the circuit breaker body based on the received movement characteristics of the position detected area portion.

More preferably, the controller may be configured to: when a contact amount between the circuit breaker body and the cradle terminal exceeds a preset allowable range of the contact amount while the circuit breaker body is at a contact position, generate a notification alarm, and output the generated notification alarm to the display.

Further, the controller may be configured to: when at least two values of a movement characteristic of the same type of among the movement characteristics of the position detected area portion detected by the sensor module are detected, compare the at least two values with each other; and when a difference between the at least two values exceeds a preset error tolerance, generate a notification alert, and output the generated notification alert to the display.

More preferably, the sensor module may include at least one of a non-contact type sensor or a contact type sensor.

Further, the position detected area portion may include at least one of: a position sticker having a shade varying in a movement direction of the truck; a plurality of position protrusions, wherein at least one of a number, a shape, or a position thereof varies in the movement direction of the truck; or a position inclined portion having one face inclined downwardly or upwardly in the truck movement direction.

More preferably, the sensor module may further include a contact type sensor configured to contact the position inclined portion and to detect a varying height of the position inclined portion and to detect the position of the circuit breaker body based on the detected varying height.

The monitoring system of the power device according to the present disclosure is capable of linearly detecting a position of a circuit breaker body over an entirety of a movement range, thereby achieving an advantage of being able to identify an accurate position of the circuit breaker body in real time.

DETAILED DESCRIPTION

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present.

As used herein, the singular forms "a" and "an" are intended to include the plural forms as well, unless the context clearly indicates otherwise.

It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, the term "A and/or B" includes any and all combinations of one or more of A and B unless otherwise specified. When referring to "C to D", this means C inclusive to D inclusive unless otherwise specified.

Hereinafter, a monitoring system of a power device according to some embodiments of the present disclosure will be described.

The same reference numerals are allocated to the same components of the monitoring system of the power device according to the present disclosure as those of the conventional power device.

Figure 5:
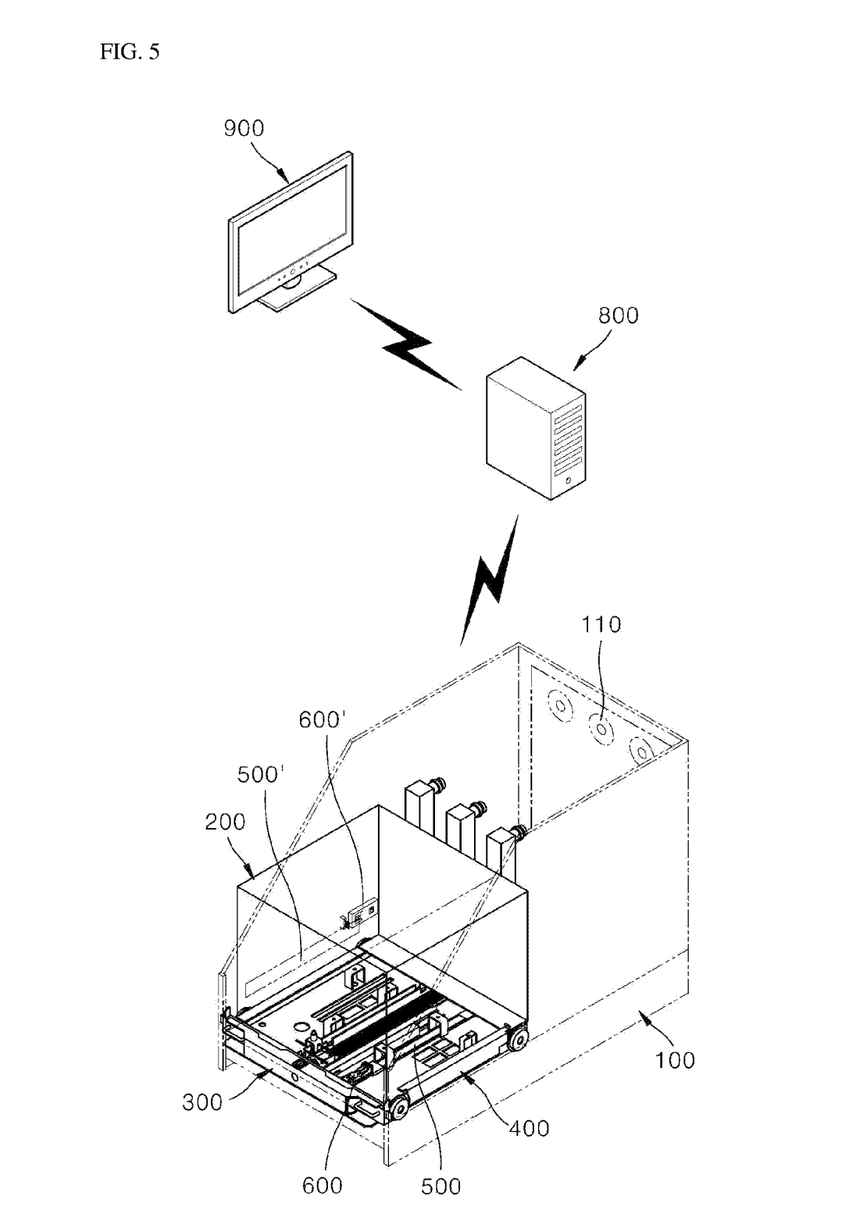
FIG. 5 is a perspective view showing a configuration of a monitoring system of a power device according to an embodiment of the present disclosure.

FIG. 5 is a perspective view showing a configuration of a monitoring system of a power device according to an embodiment of the present disclosure.

Figure 6:
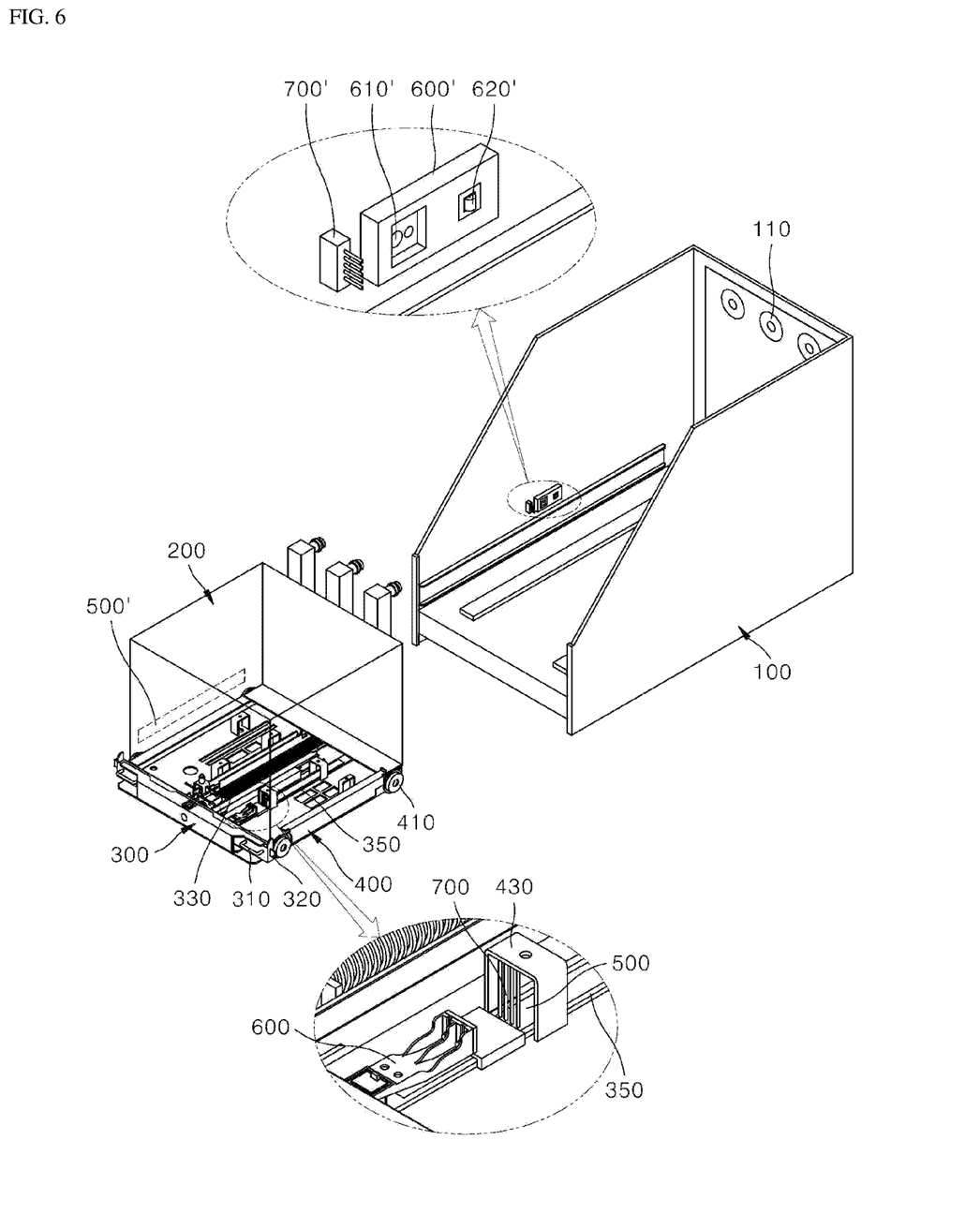
FIG. 6 is a perspective view showing a state in which a circuit breaker body is disconnected from a cradle in the monitoring system of the power device according to an embodiment of the present disclosure.

Further, FIG. 6 is a perspective view illustrating a state in which the circuit breaker body is disconnected from the cradle in the monitoring system of the power device according to an embodiment of the present disclosure.

Referring to FIG. 5 and FIG. 6, the monitoring system of the power device according to the present disclosure includes the cradle 100 having the cradle terminal 110, the girder 300 fixed to the cradle 100, the truck 400 which is movable so that a spacing between the girder 300 and the truck 400 may be adjusted, and the circuit breaker body 200 loaded on the truck 400 so as to contact or be disconnected from the cradle terminal 110.

Further, in the monitoring system of the power device according to the present disclosure, the circuit breaker includes the circuit breaker body 200, the girder 300 and the truck 400.

Further, the monitoring system of the power device according to the present disclosure includes at least one position detected area portion 500 and 500' extending in a corresponding manner to a movement range of the truck 400 and formed on the circuit breaker body 200 or the girder 300, at least one sensor module 600 and 600' that is fixedly installed on the cradle 100 or the truck 400 so as to detect movement characteristics of the position detected area portion 500 and 500' in real time, a controller 800 configured to receive the movement characteristics of the position detected area portion 500 and 500' sensed by the sensor module 600 and 600' and to detect movement characteristics of the circuit breaker body 200 based on the received movement characteristics, and a display 900 for outputting the movement characteristics of the circuit breaker body 200 detected by the controller 800.

In this case, various wired/wireless communication networks may be applied to connection between the sensor module 600 and 600' and the controller 800 and connection between the controller 800 and the display 900.

Further, the display 900 may be embodied as an administrator's portable terminal.

In one example, in the monitoring system of the power device according to the present disclosure, the disconnection position means a position in which the circuit breaker body 200 is spaced from the cradle terminal 110 by the maximum spacing and thus is electrically disconnected from the cradle terminal 110.

That is, the disconnection position refers to a state in which a spacing between the girder 300 and the truck 400 is minimized.

Further, in the monitoring system of the power device according to the present disclosure, the contact position means a position in which the circuit breaker body 200 approaches the cradle terminal 110 at the maximum level and electrically contacts the terminal 110.

That is, the contact position refers to a state in which the spacing between the girder 300 and the truck 400 is maximized, and a terminal formed on the circuit breaker body 200 is coupled to the cradle terminal 110.

Further, in the monitoring system of the power device according to the present disclosure, an operation position means a state in which the spacing between the girder 300 and the truck 400 is adjusted in a process in which the body is being displaced from the contact position to the disconnection position or from the disconnection position to the contact position.

The girder 300 includes a pair of handle bars 310 formed on a front face thereof, support ribs 320 respectively formed at both opposing sides thereof, and a spindle 330 having one end rotatably coupled to a center of the front face thereof.

More specifically, the handle bar 310 may refer to a part gripped by an operator when the girder 300 and the truck 400 are mounted to or disconnected from the cradle 100 and be formed in various shapes.

Further, the girder 300 is fixed to the cradle 100 while each of the support ribs 320 is inserted into and fixed to each of both opposing sides of the cradle 100.

Further, the spindle 330 is coupled to the truck 400 such that one end of the spindle is coupled to a central portion of the girder 300 and the other end thereof faces the cradle terminal 110.

Thus, when the spindle 300 rotates clockwise or counterclockwise, the spacing between the girder 300 and the truck 400 is adjusted.

Further, the rotation of the spindle 330 may be achieved by an operator inserting a handle to a hole formed in a front face of the girder and manually rotating the handle, or may be automatically achieved by a driving motor.

In one example, the movement characteristics of the circuit breaker body 200 output from the display 900 may include at least one of a movement distance of the circuit breaker body 200, a remaining distance thereof to the contact or disconnection position, a movement speed thereof, change in the movement speed thereof, and a contact amount between the circuit breaker body 200 and the cradle terminal 110.

More preferably, the movement characteristics of the circuit breaker body 200 output from the display 900 may be output in a form of a graph or a figure including a numerical value so that an administrator may easily identify the same.

Further, when the circuit breaker body 200 is in the contact position, the controller 800 may generate a notification alert when the contact amount between the circuit breaker body 200 and the cradle terminal 110 exceeds a preset allowable range of the contact amount, and may output the generated notification alert to the display 900.

In one example, sizes of the circuit breaker body 200 and the cradle 100 may vary based on applications thereof. Thus, when the sizes of the circuit breaker body 200 and the cradle 100 and specifications of the cradle terminal 110 are input to the controller 800, the controller 800 may be configured to automatically extract the contact amount between the circuit breaker body 200 and the cradle terminal 110 based on a distance between the circuit breaker body 200 and the cradle 100.

Accordingly, the monitoring system of the power device according to the present disclosure may minimize heat generation, device damage, safety accidents, etc. caused by incorrect coupling between the circuit breaker body 200 and the cradle terminal 110.

Further, at least two values of the same type of the movement characteristic among the movement characteristics of the position detected area portion 500 detected by the sensor module 600 may be detected. In this case, when a difference between the detected values exceeds a preset error tolerance, the controller 800 may generate a notification alert and output the same to the display 900.

More specifically, the controller 800 may compare movement characteristics respectively sensed by a plurality of sensor modules 600 respectively facing a plurality of position detected area portions 500 with each other. When the movement characteristics are different from each other based on the comparing result, the controller 800 may output the notification alert to the display 900, such that the administrator may be guided to inspect the position detecting means including the position area sensor 500 and the sensor module 600 and an entirety of the power device.

Accordingly, the monitoring system of the power device according to the present disclosure may identify an error in the movement characteristics of the circuit breaker body 200 caused by an error in the position detecting means, a defect in the sensor module 600 or a transfer failure of the truck 400 in a short time.

Figure 7:
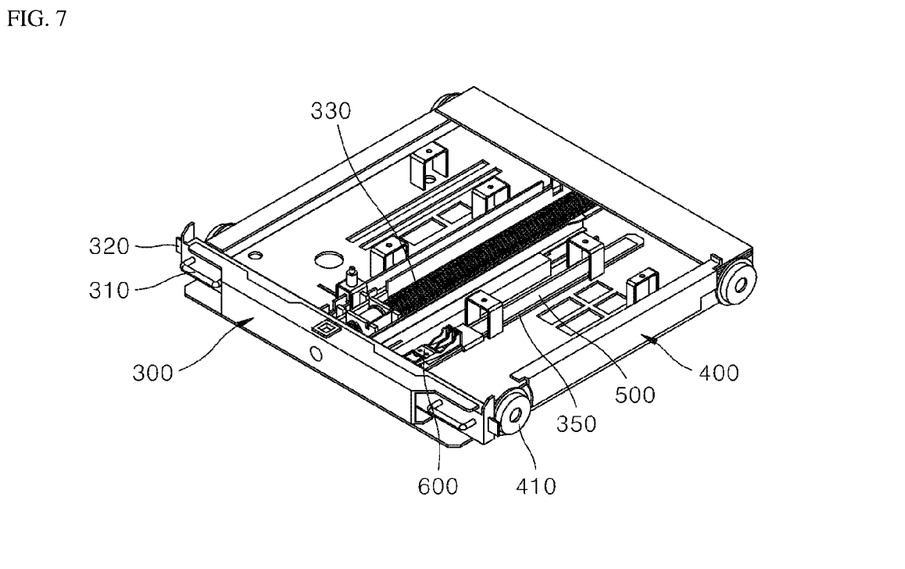
FIG. 7 is a perspective view showing a girder and a truck at a disconnection position in the monitoring system of the power device according to an embodiment of the present disclosure.
Figure 8:
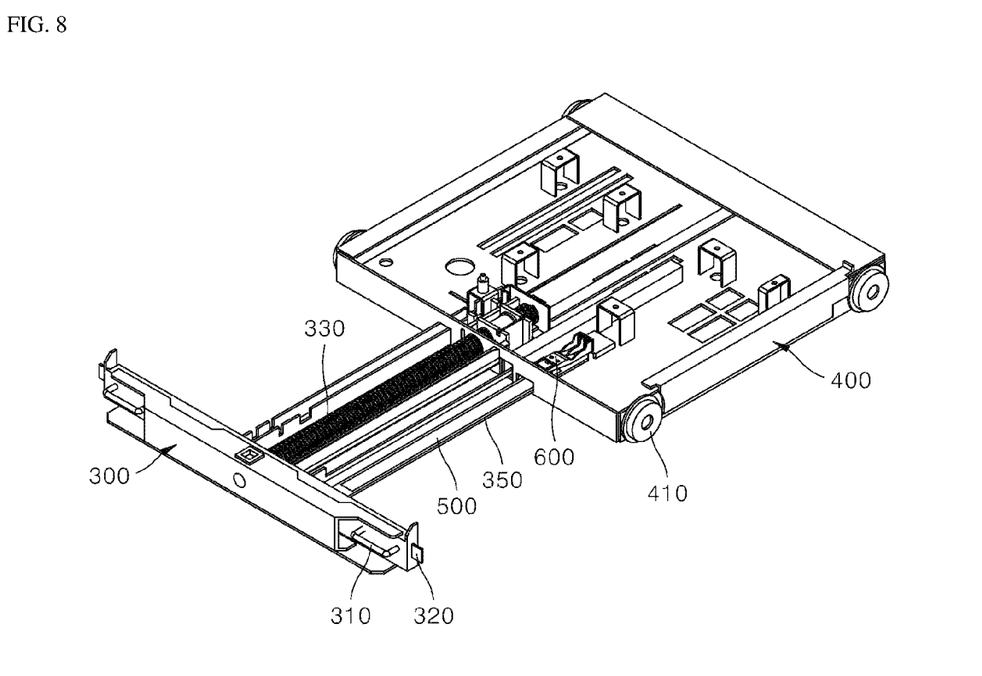
FIG. 8 is a perspective view showing a girder and a truck at a contact position in the monitoring system of the power device according to an embodiment of the present disclosure.

In one example, FIG. 7 and FIG. 8 are perspective views showing a girder and a truck at a disconnection position and a contact position in a monitoring system of a power device according to an embodiment of the present disclosure, respectively.

Figure 9:
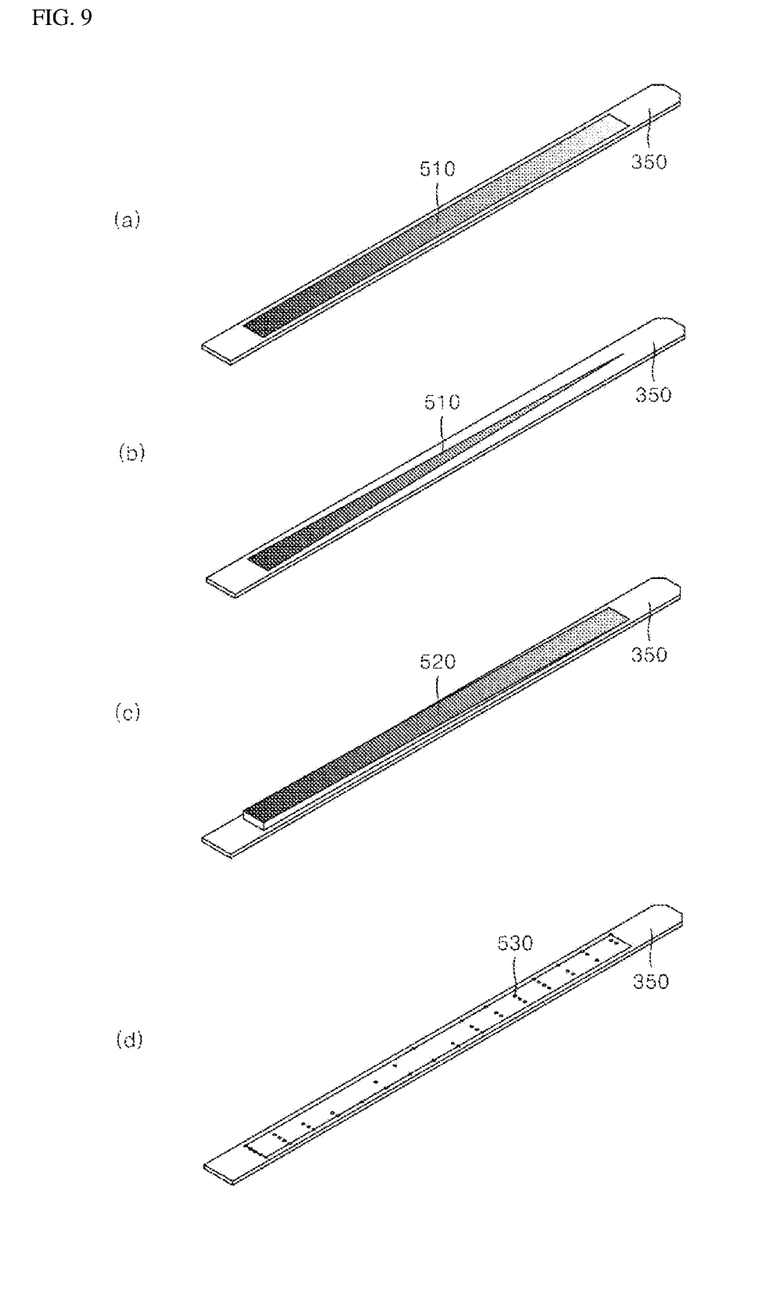
FIG. 9 is a perspective view showing a position bar in the monitoring system of the power device according to an embodiment of the present disclosure, respectively.
Figure 10:
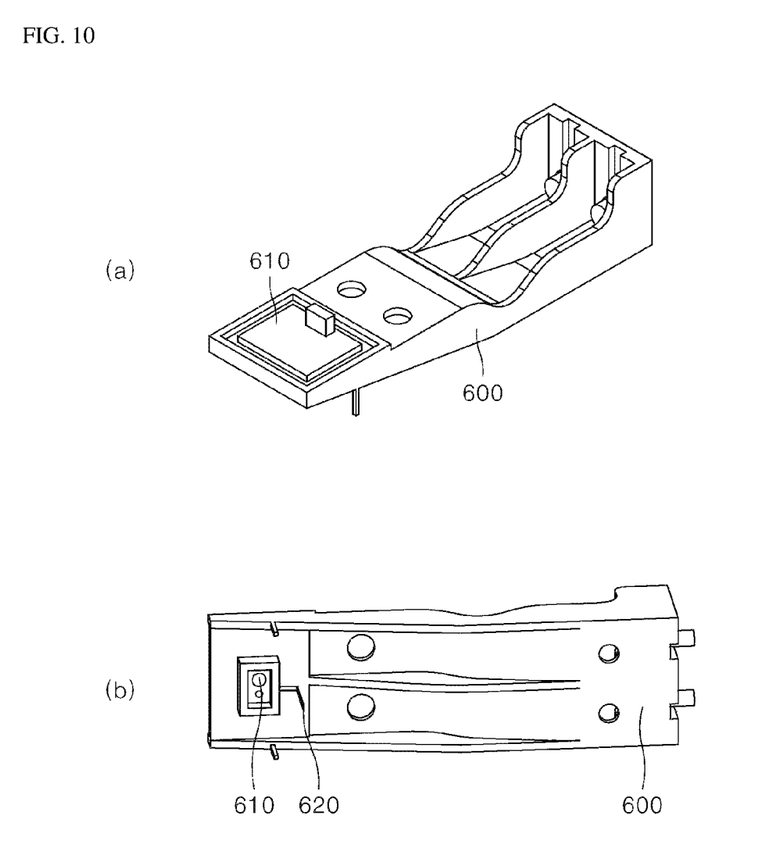
FIG. 10 is a perspective view showing each of a top face and a bottom face of a sensor module in a monitoring system of a power device according to an embodiment of the present disclosure.

Further, FIG. 9 is a perspective view showing a position bar in a monitoring system of a power device according to an embodiment of the present disclosure. FIG. 10 is a perspective view showing each of a top face and a bottom face of a sensor module in a monitoring system of a power device according to an embodiment of the present disclosure, Referring to FIG. 7 to FIG. 10, in the monitoring system of the power device according to the present disclosure, the position detected area portion 500 may be formed on a position bar 350 having one end coupled to the girder 300 and the other end acting as a free end facing the cradle terminal 110. The sensor module 600 may be fixedly coupled to one side of the truck 400 so as to detect movement characteristics of the position detected area portion 500.

More specifically, the position bar 350 may extend in parallel to the spindle 330 such that one end of the position bar 350 is coupled to the girder 300, and the other end thereof acts as the free end.

Further, the sensor module 600 may include at least one of a non-contact type sensor 610 disposed to face the position detected area portion 500 and a contact type sensor 620 disposed to contact the position detected area portion 500.

In this case, the non-contact type sensor 610 may be embodied as an optical sensor and may be configured to detect a shade, a distance, a shape, etc. of a predefined area of the position detected area portion 500.

Further, as shown in (b) of FIG. 10, the contact type sensor 620 may be embodied as an FPCB (Flexible Printed Circuit Board) or an elastic member extending toward the position bar 350 and thus contacting the position bar 350.

In one example, the position detected area portion 500 may extend along the movement range of the truck 400 as described above. More preferably, as shown in (a) of FIG. 9, the position detected area portion 500 may be embodied as a position sticker 510 having a shade varying depending on a position, such as a gradation sticker.

In this regard, the position sticker 510 may have a polygon shape such as a triangle having an area size varying in the movement direction of the circuit breaker body 200, as shown in (b) of FIG. 9.

In one example, the position detected area portion 351 may be formed as a position inclined portion 520 as shown in (c) of FIG. 9. The position inclined portion 520 may be formed to protrude upwardly beyond the top face of the position bar 350. Alternatively, the position inclined portion 520 may be formed to be recessed downwardly beyond the top face of the position bar 350.

In this regard, a gradation tape whose a shade varies as described above may be attached to a top face of the position inclined portion 520.

In one example, the position detected area portion 500 may include a plurality of position protrusions 530 arranged and spaced from each other by a predefined spacing as shown in (d) of FIG. 9.

More preferably, the numbers, shapes, positions of the position protrusions 530 may vary in the movement direction of the truck 400 so that the position of the circuit breaker body 200 may be detected by the sensor module 600.

Further, the position detected area portion 500 may include a combination of the position protrusions 530 and the position tape 510.

In one example, in the monitoring system of the power device according to the present disclosure, the truck 400 may include a plurality of position bar guides 430 adjacent to or in contact with both opposing side faces of the position bar 350.

Further, as shown in FIG. 6, the position bar guide 430 is preferably provided with a brush-type cleaner 700 capable of removing dust or foreign substances deposited on the position detected area portion 500.

Accordingly, the monitoring system of the power device according to the present disclosure may minimize a detection error of the sensor module 600 due to the foreign material deposited on the position detected area portion 500.

Further, the contact type sensor 620 may contact the position inclined portion 520 and may detect a varying height of the position inclined portion 520 and thus detect the position of the circuit breaker body 200 based on the varying height.

Figure 11:
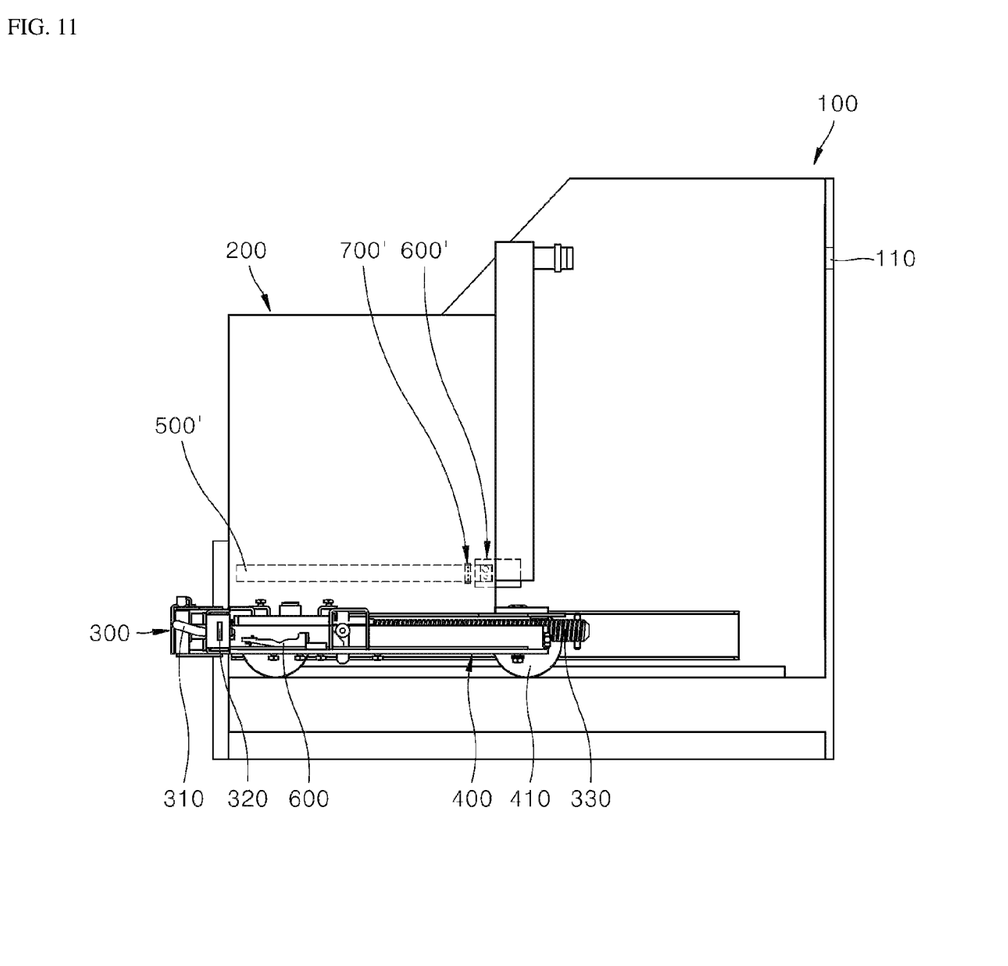
FIG. 11 is a side cross-sectional view at a disconnection position in the monitoring system of the power device according to an embodiment of the present disclosure.
Figure 12:
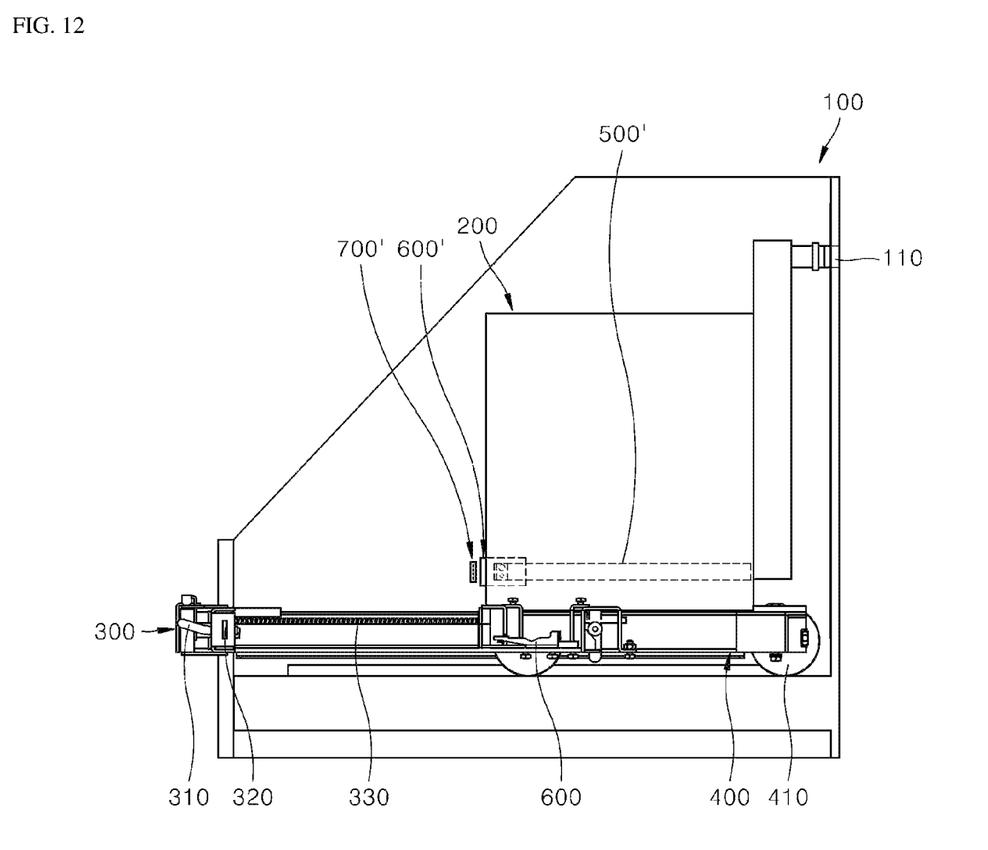
FIG. 12 is a side cross-sectional view at a contact position in the monitoring system of the power device according to an embodiment of the present disclosure.

In one example, FIG. 11 and FIG. 12 are side cross-sectional views at the disconnection position and the contact position in the monitoring system of the power device according to an embodiment of the present disclosure, respectively.

Figure 13:
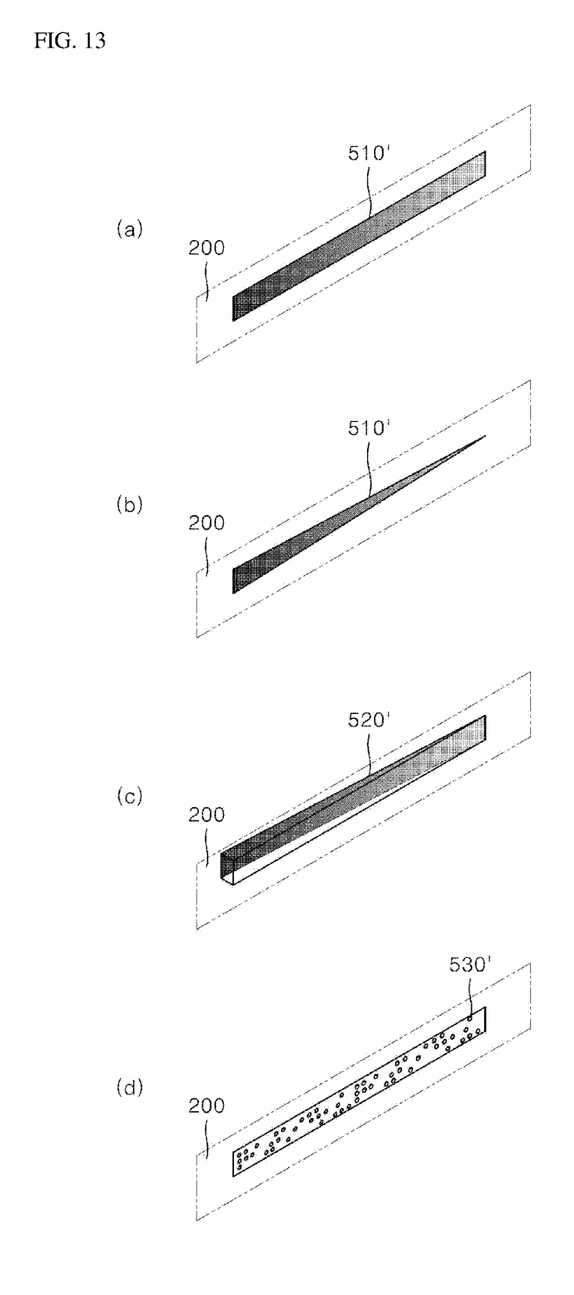
FIG. 13 is a perspective view showing a position detected area portion in the monitoring system of the power device according to an embodiment of the present disclosure.

Further, FIG. 13 is a side view illustrating a position detected area portion in a monitoring system of a power device according to an embodiment of the present disclosure.

Referring to FIG. 11 to FIG. 13, in the monitoring system of the power device according to the present disclosure, the position detected area portion 500' may be formed on a side face of the circuit breaker body 200, and the sensor module 600' may be fixedly coupled to an inner side face of the cradle 100 so as to detect the movement characteristics of the position detected area portion 500'.

In this regard, as shown in (a) of FIG. 13, the position detected area portion 500' may be embodied as a position sticker 510' having a shade varying depending on a position, such as a gradation sticker.

Alternatively, the position detected area portion 500' may have a polygon shape such as a triangle having an area size varying in the movement direction of the circuit breaker body 200, as shown in (b) of FIG. 13.

Alternatively, the position detected area portion 500' may be formed as a position inclined portion 520' as shown in (c) of FIG. 13. The position inclined portion 520' may be formed to protrude upwardly beyond the side face of the circuit breaker body 200. Alternatively, the position inclined portion 520' may be formed to be recessed downwardly beyond the side face of the circuit breaker body 200.

In this regard, a gradation tape whose a shade varies as described above may be attached to a top face of the position inclined portion 520'.

In one example, the position detected area portion 500' may include a plurality of position protrusions 530' arranged and spaced from each other by a predefined spacing as shown in (d) of FIG. 13.

More preferably, the numbers, shapes, positions of the position protrusions 530' may vary in the movement direction of the truck 400 so that the position of the circuit breaker body 200 may be detected by the sensor module 600.

Further, the position detected area portion 500' may include a combination of the position protrusions 530' and the position tape 510'.

In one example, in the monitoring system of the power device according to the present disclosure, the position detected area portion 500' may be formed on the inner side face of the cradle 100, and the sensor module 600' may be formed on the side face of the circuit breaker body 200.

However, it is more preferable that the sensor module 600' is disposed on the inner side face of the cradle 100 as described above such that connection, control, and inspection of the sensor module 600' is facilitated.

In this regard, when the sensor provided in the sensor module 600' is embodied as an optical sensor including wireless communication means, the position detected area portion 500' may be formed on an inner side face of the cradle 100, and the sensor module 600' may be disposed on the side face of the breaker body 200, according to a design specification.

More specifically, the cradle terminal 110 which the circuit breaker body 200 electrically and mechanically contacts may include terminals of three-phases (R, S, T). In this case, when contacts between the circuit breaker body 200 and these terminals 110 fail to occur concurrently, damage to the power device and power accident may occur.

Therefore, when the cradle terminal 110 which the circuit breaker body 200 electrically and mechanically contacts may include terminals of three-phases (R, S, T), the power device for continuously detecting extended and retracted positions according to the present disclosure may be configured such that the position detected area portion 500' is formed on each of both opposing side faces of the circuit breaker body 200 and accordingly, the sensor module 600' is formed on each of both opposing inner side faces of the cradle 100 so that contacts or disconnections between the circuit breaker body 200 and these terminals 110 occur concurrently.

Further, when the positions of the circuit breaker body 200 respectively detected by the two sensor modules 600' fail to coincide with each other, the display 900 may output a notification alert.

Accordingly, in the monitoring system of the power device according to the present disclosure, the circuit breaker body 200 may contact or may be disconnected from the cradle terminal 110 to prevent device damage and power accidents.

In one example, the sensor module 600' may include at least one of a non-contact type sensor 610' disposed to face the position detected area portion 500' and a contact type sensor 620' of a roller type contacting the position detected area portion 500', as shown in FIG. 6.

Further, a brush or roller type cleaner 700' may be disposed in front or rear of the sensor module 600' so as to remove dust or foreign substances adhering to a surface of the position detected area portion 500'.

In one example, the cleaner 700 is more preferably installed in front of the sensor module 600.

When the cleaner 700 is adjacent to the cradle terminal 110, arc may occur such that the cleaner 700 may be damaged or an electrical problem may occur. Thus, the cleaner 700 may be spaced from the cradle terminal 110 by a maximum spacing.

The present disclosure has been described above with reference to the illustrated drawings. However, the present disclosure is not limited to the embodiments and drawings disclosed in the present specification. It is obvious that various modifications may be made by those skilled in the art within the scope of the technical idea of the present disclosure. In addition, although effects according to the configurations of the present disclosure are not explicitly described while describing the embodiments of the present disclosure, it is natural that the predictable effects from the configurations should also be appreciated.

What is claimed is:

1. A monitoring system of a power device comprising:
   a cradle having a cradle terminal disposed on a rear side thereof;
   a circuit breaker configured to mechanically and electrically contact or be disconnected from the cradle terminal;
   at least one position detecting means mounted inside the circuit breaker so as to detect a position of a circuit breaker body linearly and in real time over an entirety of a movement range of the circuit breaker body; and
   a display for outputting movement characteristics of the circuit breaker body detected by the position detecting means.

2. The system of claim 1, wherein the movement characteristics of the circuit breaker body output from the display includes at least one of a movement distance of the circuit breaker body, a remaining distance thereof to a contact or disconnection position, a movement speed thereof, change in the movement speed thereof, a contact amount between the circuit breaker body and the cradle terminal, or an expected time duration for which the circuit breaker body has been inserted.

3. The system of claim 1, wherein the position detecting means includes:
   a position bar including at least one position detected area portion extending in a corresponding manner to a movement range of the circuit breaker body, wherein one end of the position bar is coupled to a girder fixedly installed on a front face of the cradle, and the other end of the position bar acts as a free end facing the rear side of the cradle;
   a sensor module installed inside a truck, wherein the circuit breaker body is loaded on the truck, and the position bar is inserted into the truck, wherein the truck is configured to reciprocate from the girder to the cradle terminal and inside the cradle, wherein the sensor module includes at least one sensor facing the position detected area portion; and
   a controller configured to receive movement characteristics of the position detected area portion detected by the sensor module, and to detect the movement characteristics of the circuit breaker body based on the received movement characteristics of the position detected area portion.

4. The system of claim 1, wherein the position detecting means includes:
   a position detected area portion formed on at least one of both opposing side faces of the circuit breaker body;
   a sensor module including at least one sensor facing the position detected area portion so as to detect a displaced position of the position detected area portion and thus detect a position of the circuit breaker body, based on the detect displaced position, wherein the sensor module is fixed to at least one of both opposing inner faces of the cradle; and
   a controller configured to receive movement characteristics of the position detected area portion detected by the sensor module, and to detect the movement characteristics of the circuit breaker body based on the received movement characteristics of the position detected area portion.

5. The system of claim 3, wherein the controller is configured to:
   when a contact amount between the circuit breaker body and the cradle terminal exceeds a preset allowable range of the contact amount while the circuit breaker body is at a contact position, generate a notification alarm, and output the generated notification alarm to the display.

6. The system of claim 3, wherein the controller is configured to:
   when at least two values of a movement characteristic of the same type of among the movement characteristics of the position detected area portion detected by the sensor module are detected, compare the at least two values with each other; and
   when a difference between the at least two values exceeds a preset error tolerance, generate a notification alert, and output the generated notification alert to the display.

7. The system of claim 3, wherein the sensor module includes at least one of a non-contact type sensor or a contact type sensor.

8. The system of claim 3, wherein the position detected area portion includes at least one of:
   a position sticker having a shade varying in a movement direction of the truck;
   a plurality of position protrusions, wherein at least one of a number, a shape, or a position thereof varies in the movement direction of the truck; or
   a position inclined portion having one face inclined downwardly or upwardly in the truck movement direction.

9. The system of claim 8, wherein the sensor module further includes a contact type sensor configured to contact the position inclined portion and to detect a varying height of the position inclined portion and to detect the position of the circuit breaker body based on the detected varying height.

10. A monitoring system of a power device comprising:
    a cradle having a cradle terminal disposed on a rear side thereof;
    a circuit breaker configured to mechanically and electrically contact or be disconnected from the cradle terminal;
    at least one position detecting means mounted inside the circuit breaker so as to detect a position of a circuit breaker body in real time; and
    a display for outputting movement characteristics of the circuit breaker body detected by the position detecting means,
    wherein the position detecting means includes:
        a position bar including at least one position detected area portion extending in a corresponding manner to a movement range of the circuit breaker body, wherein one end of the position bar is coupled to a girder fixedly installed on a front face of the cradle, and the other end of the position bar acts as a free end facing the rear side of the cradle;

a sensor module installed inside a truck, wherein the circuit breaker body is loaded on the truck, and the position bar is inserted into the truck, wherein the truck is configured to reciprocate from the girder to the cradle terminal and inside the cradle, wherein the sensor module includes at least one sensor facing the position detected area portion; and a controller configured to receive movement characteristics of the position detected area portion detected by the sensor module, and to detect the movement characteristics of the circuit breaker body based on the received movement characteristics of the position detected area portion.

11. A monitoring system of a power device comprising:

a cradle having a cradle terminal disposed on a rear side thereof;

a circuit breaker configured to mechanically and electrically contact or be disconnected from the cradle terminal;

at least one position detecting means mounted inside the circuit breaker so as to detect a position of a circuit breaker body in real time; and a display for outputting movement characteristics of the circuit breaker body detected by the position detecting means, wherein the position detecting means includes:

a position detected area portion formed on at least one of both opposing side faces of the circuit breaker body;

a sensor module including at least one sensor facing the position detected area portion so as to detect a displaced position of the position detected area portion and thus detect a position of the circuit breaker body, based on the detect displaced position, wherein the sensor module is fixed to at least one of both opposing inner faces of the cradle; and a controller configured to receive movement characteristics of the position detected area portion detected by the sensor module, and to detect the movement characteristics of the circuit breaker body based on the received movement characteristics of the position detected area portion.

* * * * *